(12) United States Patent
Wang

(10) Patent No.: US 11,498,770 B2
(45) Date of Patent: Nov. 15, 2022

(54) DATA OBJECT INFORMATION PROCESSING METHODS, APPARATUSES, AND SYSTEMS

(71) Applicant: ALIBABA GROUP HOLDING LIMITED, Grand Cayman (KY)

(72) Inventor: Shuimin Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 535 days.

(21) Appl. No.: 16/510,777

(22) Filed: Jul. 12, 2019

(65) Prior Publication Data

US 2019/0337729 A1    Nov. 7, 2019

Related U.S. Application Data

(63) Continuation of application No. PCT/CN2018/072040, filed on Jan. 10, 2018.

(30) Foreign Application Priority Data

Jan. 22, 2017    (CN) .......................... 201710047501.9

(51) Int. Cl.
*G06F 7/00*        (2006.01)
*B65G 43/08*       (2006.01)
(Continued)

(52) U.S. Cl.
CPC ............. *B65G 43/08* (2013.01); *B65G 17/20* (2013.01); *B65G 43/10* (2013.01);
(Continued)

(58) Field of Classification Search
CPC ........ B65G 43/08; B65G 17/20; B65G 43/10; B65G 47/61; B65G 1/1378; B65G 47/48;
(Continued)

(56) References Cited

U.S. PATENT DOCUMENTS 4,792,273 A    12/1988 Specht
5,509,538 A     4/1996 Spindler et al.
(Continued)

FOREIGN PATENT DOCUMENTS

CN    102117319 A    7/2011
CN    203588314 U    5/2014
(Continued)

OTHER PUBLICATIONS

European Patent Office Communication issued for Application No. 18741343.0 which encloses the extended European Search Report which includes pursuant to Rule 62 EPC, the Supplementary European Search Report (Art. 153(7) EPC) and the European search opinion, dated Nov. 26, 2019, 12 pages.
(Continued)

*Primary Examiner* — Yolanda R Cumbess
(74) *Attorney, Agent, or Firm* — Finnegan, Henderson, Farabow, Garrett & Dunner, LLP

(57) ABSTRACT

Data object information processing methods, apparatuses, and systems are provided. The data object information processing system includes a suspension chain conveyance subsystem. The suspension chain conveyance subsystem is deployed in an offline store including first operation regions and second operation regions. The suspension chain conveyance subsystem includes a control component and a conveying track. The conveying track is configured to connect the first operation regions and the second operation regions. The control component is configured to assign a second operation region according to the wave identifier after receiving a notification message from a first operation execution subsystem. First operation tasks of the wave correspond to the same second operation region. A conveyance instruction is sent to the conveying track according to
(Continued)

the assignment result, for conveying the first operation container to the corresponding second operation region.

20 Claims, 8 Drawing Sheets

(51) Int. Cl.
    *B65G 17/20*         (2006.01)
    *B65G 43/10*         (2006.01)
    *G05B 19/418*       (2006.01)
    *G06K 7/14*          (2006.01)
    *G06Q 10/08*         (2012.01)
    *G06Q 30/06*         (2012.01)

(52) U.S. Cl.
    CPC ..... *G05B 19/41865* (2013.01); *G06K 7/1408* (2013.01); *G06Q 10/087* (2013.01); *G06Q 30/0635* (2013.01)

(58) Field of Classification Search
    CPC .............. B65G 43/00; G05B 19/41865; G06K 7/1408; G06Q 10/087; G06Q 30/0635; G06Q 10/083; G06Q 10/0875; G06Q 30/06; G06Q 50/28; G06Q 30/0601
    USPC ......................... 700/213–216, 223, 228, 230
    See application file for complete search history.

(56) References Cited

U.S. PATENT DOCUMENTS

| | | | |
|---|---|---|---|
| 8,682,473 | B1 | 3/2014 | Ramey et al. |
| 2007/0150383 | A1 | 6/2007 | Shakes et al. |
| 2007/0187183 | A1* | 8/2007 | Saigh ..................... E04H 14/00 186/53 |
| 2013/0014189 | A1 | 1/2013 | Rosenberg et al. |
| 2017/0278055 | A1* | 9/2017 | Winkler ............... B65G 1/1373 |

FOREIGN PATENT DOCUMENTS

| | | | |
|---|---|---|---|
| CN | 104881768 | A | 9/2015 |
| CN | 105631638 | A | 6/2016 |
| CN | 106185152 | A | 12/2016 |
| CN | 106216254 | A | 12/2016 |
| JP | S48002668 | A | 1/1978 |
| JP | H09-058860 | | 3/1997 |
| JP | 2001253515 | A | 9/2001 |
| JP | 2002249209 | A | 9/2002 |
| JP | 2003171001 | A | 6/2003 |
| JP | 5156880 | B1 | 3/2013 |
| JP | 2016060626 | A | 4/2016 |
| WO | WO 95/21116 | A1 | 8/1995 |
| WO | WO 2008/140293 | A1 | 11/2008 |
| WO | WO 2018/133714 | A1 | 7/2018 |

OTHER PUBLICATIONS

First Chinese Office Action issued in Chinese Application No. 201710047501.9 dated Mar. 30, 2021, 17 pages.
Japanese Office Action issued in corresponding Japanese Application No. 2019-538487 dated Sep. 22, 2021 (24 pages).
Japanese Search Report issued in Japanese Application No. 2019-538487 dated Jun. 18, 2021, 16 pages.
PCT International Search Report and Written Opinion dated Mar. 29, 2018, issued in corresponding International Application No. PCT/US2018/072040 (12 pgs.).
First Chinese Search Report issued in Chinese Application No. 201710047501.9 dated Mar. 18, 2021, 1 page.

* cited by examiner

DATA OBJECT INFORMATION PROCESSING METHODS, APPARATUSES, AND SYSTEMS

CROSS-REFERENCE TO RELATED APPLICATIONS

The present application claims priority to International Application No. PCT/CN2018/072040, filed Jan. 10, 2018, which claims priority to and the benefits of Chinese Patent Application No. 201710047501.9, filed on Jan. 22, 2017, both of which are incorporated herein by reference in their entireties.

TECHNICAL FIELD

The disclosure relates to the field of data object information processing technologies, and in particular, to data object information processing methods, apparatuses, and systems.

BACKGROUND

Online To Offline (O2O) refers to merging offline business opportunities with the Internet to make the Internet a platform for offline transactions. With the upgrading of service-oriented e-commerce models, the processes of commodities (services), ordering, and payment have been improved, which shift previous simple e-commerce modules to more high-frequency, life-oriented scenarios. Due to the low-efficiency and insufficient labor absorption of the conventional service industry, an O2O boom, driven by new business models, is coming and thus various O2O business models, such as meals delivery service (commonly referred to as "order-out"), fresh product delivery service, door-to-door makeup service, etc., are starting to gain popularity one after another.

Here, offline stores corresponding to fresh commodity objects may be referred to as "supermarkets." In an actual application, a supermarket may be provided with multiple stalls, which, for example, may include a fruit stall, a seafood stall, and so on. Specific goods in each stall may be purchased and enter the supermarket in advance. Compared to fast-food commodity objects, it is usually uncommon to package fresh commodity objects in advance using standardized packaging tools such as "meal boxes." For example, if the commodity is apples, a consumer may specify total kilograms for the purchase when placing an order. After receiving the order, the supermarket usually needs to weigh the apples first, then perform the packaging. In other words, a "processing" is usually performed to the fresh commodity objects according to specifications in orders after the orders are received. The so-called "processing" may include weighing of goods and other operations. After the processing is completed, the commodity objects are packaged and await delivery.

Accordingly, it usually takes more time to carry out offline order-picking, packaging, delivery, and other operations on commodities such as fresh commodities after online orders are received, and it is often difficult to guarantee the timeliness of delivery. Therefore, how to improve the efficiency of offline operations and to improve the timeliness of delivery has become a technical problem that needs to be solved for those skilled in the art.

SUMMARY

Embodiments of the present disclosure provide data object information processing methods, apparatuses, and systems.

According to some embodiments of the present disclosure, data object information processing systems are provided. One exemplary data object information processing system includes: a suspension chain conveyance subsystem deployed in an offline store comprising a plurality of first operation regions and a plurality of second operation regions, wherein the suspension chain conveyance subsystem comprises a control component and a conveying track, and the conveying track is configured to connect the first operation regions and the second operation regions; an order processing subsystem configured to merge a plurality of orders meeting a condition into a wave according to a preset rule; a first operation task generation subsystem configured to classify data objects in the orders of the wave according to different first operation regions where corresponding goods are located and to generate a plurality of first operation tasks according to a classification result, wherein the first operation tasks of the wave correspond to the same second operation region; a first operation execution subsystem, wherein the first operation task generation subsystem is further configured to allocate the first operation tasks to the corresponding first operation execution subsystem, and the first operation execution subsystem is configured to notify the suspension chain conveyance subsystem of a task identifier of the current first operation task and a wave identifier of the wave to which the current first operation task belongs, after receiving a message indicating that a current first operation task is completed and a first operation container is suspended from a suspension chain. The first operation container contains goods corresponding to the current first operation task. The control component is configured to assign the corresponding second operation region according to the wave identifier after receiving a notification message from the first operation execution subsystem, and to send, according to an assignment result, a conveyance instruction to the conveying track to convey the first operation container to the corresponding second operation region.

According to some embodiments of the present disclosure, data object information processing methods for an offline store having first operation regions and second operation regions are provided. One exemplary data object information processing method includes: receiving, by a first operation task generation subsystem, wave information pending to be operated, wherein a plurality of orders meeting a preset condition are merged into a wave; classifying data objects in the orders of the wave according to different first operation regions where corresponding goods are located; generating a plurality of first operation tasks according to a classification result and allocating the first operation tasks to a corresponding first operation execution subsystem; notifying, by the first operation execution subsystem, a suspension chain conveyance subsystem of a task identifier of a current first operation task and a wave identifier of the wave to which the current first operation task belongs, after receiving a message indicating that the current first operation task is completed and a first operation container is suspended from a suspension chain; and conveying, by the suspension chain conveyance subsystem, the first operation containers corresponding to the first operation tasks of the wave to the same second operation region, wherein the suspension chain conveyance subsystem is deployed in the offline store and comprises a control component and a conveying track configured to connect the first operation regions and the second operation regions.

Another exemplary data object information processing method includes: receiving one of a plurality of first operation tasks disassembled from a wave by a first operation execution subsystem, wherein the wave corresponds to a plurality of orders meeting a condition; after receiving a message indicating that the received first operation task is completed and a corresponding first operation container is suspended from a suspension chain, notifying a suspension chain conveyance subsystem of a task identifier of the received first operation task and a wave identifier of the wave to which the received first operation task belongs; and conveying, by the suspension chain conveyance subsystem, first operation containers corresponding to the first operation tasks of the wave to the same second operation region, wherein the suspension chain conveyance subsystem is deployed in the offline store and comprises a control component and a conveying track configured to connect the first operation regions and the second operation regions.

Yet another exemplary data object information processing method includes: receiving, by a suspension chain conveyance subsystem, a notification message provided by a first operation execution subsystem, wherein the suspension chain conveyance subsystem is deployed in the offline store and comprises a control component and a conveying track configured to connect the first operation regions and the second operation regions, and the notification message indicates that a first operation task is completed and a first operation container is suspended from the conveying track; assigning the corresponding second operation region according to a wave identifier to which the first operation task belongs, wherein the first operation tasks of the wave correspond to the same second operation region, and the wave corresponds to a plurality of orders meeting a condition and is disassembled into a plurality of first operation tasks; and sending a conveyance instruction to the conveying track according to an assignment result, to convey the first operation container to the corresponding second operation region.

According to some embodiments of the present disclosure, data object information processing apparatuses for an offline store having first operation regions and second operation regions are provided. One exemplary data object information processing apparatus is applied to a first operation task generation subsystem and includes a memory storing a set of instructions and a processor configured to execute the set of instructions to cause the data object information processing apparatus to perform: receiving wave information pending to be operated, wherein a plurality of orders meeting a preset condition are merged into a wave; classifying data objects in the orders of the wave according to different first operation regions where corresponding goods are located; and generating a plurality of first operation tasks according to a classification results, and allocating the first operation tasks to a corresponding first operation execution subsystem, wherein after receiving a message indicating that a first operation task is completed and a first operation container is suspended from a suspension chain, the first operation execution subsystem notifies a suspension chain conveyance subsystem of a task identifier of a current first operation task and a wave identifier of the wave to which the current first operation task belongs, and the suspension chain conveyance subsystem conveys first operation containers corresponding to the first operation tasks of the wave to the same second operation region, wherein the suspension chain conveyance subsystem is deployed in the offline store and comprises a control component and a conveying track configured to connect the first operation regions and the second operation regions.

Another exemplary data object information processing apparatus is applied to a first operation execution subsystem and includes a memory storing a set of instructions and a processor configured to execute the set of instructions to cause the data object information processing apparatus to perform: receiving a first operation task, wherein the received first operation task is one of a plurality of first operation tasks disassembled from a wave which corresponds to a plurality of orders meeting a condition; and after receiving a message indicating that the first operation task is completed and a corresponding first operation container is suspended from a suspension chain, notifying a suspension chain conveyance subsystem of the task identifier of the first operation task and the wave identifier of the wave to which the first operation task belongs, wherein the suspension chain conveyance subsystem conveys first operation containers corresponding to the plurality of first operation tasks of the wave to the same second operation region, the suspension chain conveyance subsystem is deployed in the offline store and comprises a control component and a conveying track configured to connect the first operation regions and the second operation regions.

Yet another exemplary data object information processing apparatus is applied to a suspension chain conveyance subsystem deployed in the offline store and including a control component and a conveying track configured to connect the first operation regions and the second operation regions. The data object information processing apparatus includes a memory storing a set of instructions and a processor configured to execute the set of instructions to cause the data object information processing apparatus to perform: receiving a notification message provided by a first operation execution subsystem, wherein the notification message indicates that a first operation task is completed and a first operation container is suspended from the conveying track; assigning the corresponding second operation region according to a wave identifier of a wave to which the first operation task belongs, wherein the first operation tasks of the wave correspond to the same second operation region, and the wave corresponds to a plurality of orders meeting a condition and is disassembled into a plurality of first operation tasks; and sending a conveyance instruction to the conveying track according to an assignment result, in order to convey the first operation container to the corresponding second operation region.

According to some embodiments of the present disclosure, non-transitory computer-readable media are provided. One exemplary non-transitory computer-readable medium stores a set of instructions that is executable by at least one processor of an apparatus to cause the apparatus to perform a data object information processing method for an offline store including first operation regions and second operation regions. The data object information processing method includes: receiving, by a first operation task generation subsystem, wave information pending to be operated, wherein a plurality of orders meeting a preset condition are merged into a wave; classifying data objects in the orders of the wave according to different first operation regions where corresponding goods are located; generating a plurality of first operation tasks according to a classification result and allocating the first operation tasks to a corresponding first operation execution subsystem; and notifying, by the first operation execution subsystem, a suspension chain conveyance subsystem of a task identifier of a current first operation task and a wave identifier of the wave to which the current first operation task belongs, after receiving a message indicating that the current first operation task is completed and a first operation container is suspended from a suspension chain, in order to convey first operation containers corresponding to the first operation tasks of the wave to the same second operation region by the suspension chain conveyance subsystem which is deployed in the offline store and comprises a control component and a conveying track configured to connect the first operation regions and the second operation regions.

Another exemplary non-transitory computer-readable medium stores a set of instructions that is executable by at least one processor of an apparatus to cause the apparatus to perform a data object information processing method for an offline store including first operation regions and second operation regions. The data object information processing method includes: receiving, by a suspension chain conveyance subsystem, a notification message provided by a first operation execution subsystem, wherein the suspension chain conveyance subsystem is deployed in the offline store and comprises a control component and a conveying track configured to connect the first operation regions and the second operation regions, and the notification message indicates that a first operation task is completed and a first operation container is suspended from the conveying track; assigning the corresponding second operation region according to a wave identifier of a wave to which the first operation task belongs, wherein the first operation tasks of the wave correspond to the same second operation region, and the wave corresponds to a plurality of orders meeting a condition and is disassembled into a plurality of first operation tasks; and sending a conveyance instruction to the conveying track according to an assignment result, to convey the first operation container to the corresponding second operation region.

BRIEF DESCRIPTION OF THE DRAWINGS

In order to describe the technical solutions in the embodiments of the present disclosure or in the prior art more clearly, the accompanying drawings to be used in the description of the embodiments are briefly introduced. It is apparent that the accompanying drawings described in the following are merely some embodiments of the present disclosure. Those skilled in the art may further obtain other accompanying drawings according to these accompanying drawings without creative efforts.

DETAILED DESCRIPTION

Figure 1:
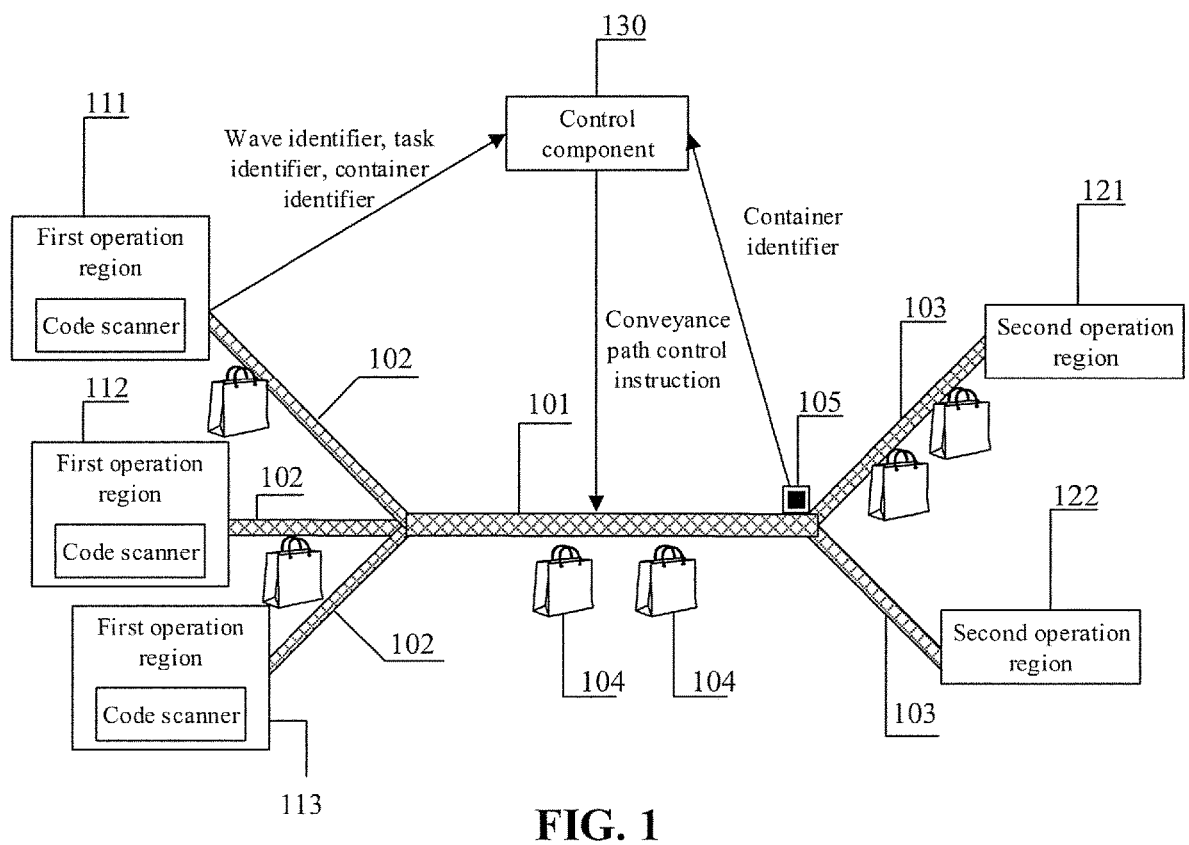
FIG. 1 is an exemplary schematic architectural diagram illustrating software and hardware according to some embodiments of the present disclosure.

It is to be understood that both the foregoing general description and the following detailed description are examples and explanatory only and are not restrictive of the disclosed embodiments as claimed. The accompanying drawings constitute a part of this specification. The drawings illustrate several embodiments of the present disclosure and, together with the description, serve to explain the principles of the disclosed embodiments as set forth in the accompanying claims. Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims. The technical solutions in various embodiments of the present disclosure will be described in the following description with reference to the accompanying drawings in the embodiments of the present disclosure. It is apparent that the embodiments described herein are merely some embodiments of the present disclosure rather than all embodiments. All other embodiments obtained by those skilled in the art based on the embodiments described in the present disclosure without creative efforts shall fall within the scope of the present disclosure.

In the embodiments of the present disclosure, in order to improve the efficiency of order-picking and delivery, a suspension chain conveyance system may be deployed in an offline store. The suspension chain conveyance system includes a conveying track, a suspension chain, and other automatic conveyance devices. Thus, after receiving an order and completing a first operation (e.g., operations such as order-picking, etc.), it can be conveyed to a preset second operation (e.g., operations such as packaging, etc.) region by the suspension chain and the conveying track. If the offline store includes multiple first operation regions, that is, multiple "stalls," each "stall" can have a conveying track for conveyance to a centralized second operation region. A suspension chain can be arranged on each conveying track. That is, there may be several suspension chains, each of which has a conveyance starting point corresponding to the position of a first operation region and an ending point corresponding to a second operation region. After receiving a first operation task and performing operations, such as weighting, to corresponding goods in a stall, the goods may be loaded into a preset container such as a packaging bag, and be suspended from the suspension chain. Then, the corresponding conveying track may automatically convey the container containing the corresponding goods to a second operation region, to carry out a second operation such as packaging in the second operation region. Then, a deliverer can deliver the goods. Thus, a first operator may only have to perform operations such as weighing the goods and suspending the goods on the suspension chain, without having to send the goods from the first operation region to the second operation region. Therefore, the work efficiency can be improved.

In a small offline store or when there is a small quantity of orders, there may be one second operation region, that is, in some embodiments, all first operation containers produced from the first operation can converge in the same second operation region for packaging. However, in some embodiments, considering that the number of concurrent orders increases as the number of users increases, a bottleneck of operational efficiency may exist when having the same second operation region for performing the second operation if there is a large number of orders. Therefore, in order to further improve the efficiency of the first operation, the second operation, and other operations and to ensure the timeliness of delivery, in some embodiments, there may be multiple second operation regions. In other words, an offline store may include multiple first operation regions and multiple second operation regions. The "multiple first operation regions" as used herein refer to multiple "stalls." Each of the first operation regions is configured to store the same type of goods. Correspondingly, the first operation (e.g., mainly the order-picking operation) for this type of goods is also carried out in this first operation region. The second operation region refers to a region for performing operations such as packaging. In other words, the first operation and the second operation may be performed synchronously in several different regions to improve the efficiency of the first operation and of the second operation.

In addition, a large number of concurrent orders may occur frequently, that is, multiple orders may be received in a very short time. If a delivery is performed for each order, apparently a large number of delivery resources will be occupied, which reduces the timeliness of delivery when delivery resources are limited. Therefore, orders can also be merged in some embodiments of the present disclosure. In other words, multiple orders can be merged into the same delivery wave, and orders in the same delivery wave can be delivered by one deliverer at the same time. Thus, waste of delivery resources is avoided and the timeliness of delivery of the orders are further guaranteed. When merging orders, some order-merging rules can be made in advance. For example, factors such as delivery addresses and requested delivery times may be taken into consideration, so as to merge the orders with nearby delivery addresses and similar requested delivery times into the same wave, and so on.

In the case of generating a delivery wave according to the foregoing order-merging operation, data objects (e.g., commodity objects, etc.) involved in the same delivery wave need to be packaged together and delivered by the same deliverer. Therefore, the first operations (e.g., order-picking operations) may also be performed simultaneously at the time of order-picking. Moreover, the same wave includes multiple orders. Thus, the same wave may include multiple different data objects, and goods corresponding to the data objects may be located in different first operation regions. Therefore, the data objects included in the orders of the same wave may also be classified according to the different first operation regions where the corresponding goods are located, to generate multiple first operation tasks according to the classification result. In other words, after merging the orders to generate a wave, the same wave may also be disassembled into multiple first operation tasks before performing the first operation tasks. Each first operation task can be completed by a worker in the first operation region involved.

Upon completion, each first operation task may be conveyed to a second operation region by a suspension chain system. In some embodiments of the present disclosure, there are multiple second operation regions. Specifically, there may be multiple packaging regions, or the same packaging region includes multiple "gates," in which corresponding packers at different gates are responsible for packaging operations at the gates. The multiple "gates" in the same packaging region substantially divide the packaging region into multiple sub-regions, each of which works independently. Therefore, they are collectively referred to as multiple second operation regions in the embodiments of the present disclosure. When there are multiple second operation regions, during conveyance of execution results of the first operation tasks using the suspension chain system, the execution results (e.g., containers, such as packaging bags, with goods associated with the same first operation task) of first operation tasks in the same wave may also be controlled to converge in the same second operation region.

In other words, in some embodiments of the present disclosure, the orders may be merged at first to generate a wave. Then, the wave is disassembled into multiple first operation tasks, and the execution results of the first operation tasks in the same wave converge in the same second operation region. With such automatic control, the efficiency of the first operation and of the second operation can be improved, which is beneficial to guaranteeing the timeliness of delivery.

According to embodiments provided in the present disclosure, the following technical effects are disclosed in the present disclosure. By utilizing the embodiments of the present disclosure, the first operations, conveyance, and the second operations in the offline store are combined in series organically. The containers produced from the first operations can be conveyed to the second operation regions automatically by the suspension chain subsystem. Moreover, different first operation tasks of the same wave may also converge in the same second operation region to improve the efficiency of the first operation and of the second operation, and the timeliness of delivery can be further guaranteed.

In addition, a fault management subsystem is further provided in the embodiments of the present disclosure. The fault management subsystem may track the status of first operation tasks, the assignment of the second operation regions, etc. Once some first operation tasks of a certain wave fail to arrive at a scheduled second operation region on time, the fault management subsystem can be utilized to make a query and locate the cause of the exception, thus avoiding stalling of the operations of the entire wave. Apparently, any product implementing the present disclosure may not necessarily achieve all the above advantages at the same time.

In actual implementation, the suspension chain system may be deployed in the offline store in a variety of manners, as long as there is a path between each first operation region and each second operation region and specific conveying paths can be controlled in the conveyance process. For example, in one implementation manner, a suspension chain system 100 may be deployed as shown in FIG. 1. Assuming that there are three first operation regions 111, 112, 113 and two second operation regions 121, 122 in the offline store, when deploying the conveying tracks of the suspension chain system, the conveying track may be divided into a trunk 101, first branches 102, and second branches 103 in order to save space and avoid confusion caused by the interweaving of too many conveying tracks. There may be only one trunk 101, which is the common part of the tracks. There may be multiple first branches 102, with the first end of each corresponding to one first operation region 111, 112, 113 and the other end of each connecting to the trunk 101. Similarly, there may also be multiple second branches 103, with the first end of each corresponding to one second operation region 121, 122 and the other end of each connecting to the trunk 101. Thus, the conveying tracks may extend to each first operation region 111, 112, 113 and each second operation region 121, 122, without interweaving tracks. In actual implementation, the conveying track may be "hung" from the ceiling of the offline store. The operator of the first operation can suspend a container onto the conveying track for conveyance. In this manner, the space of the offline store can be saved to avoid limiting the area of the operation regions in the store due to the existence of the conveying track. In addition, in order to prevent the container from falling off the track in the process of conveyance, a "safety net" can be provided under the track. Thus, if the container falls off the track, it will fall into the "safety net" to avoid hurting people in the offline store or damaging items in the container. Apparently, in various implementation manners, the conveying track may also be built in other manners, and the present disclosure is not limited thereto.

When the conveying track is deployed in the foregoing manner, the conveying track may continuously move along the direction from the first operation region 111, 112, 113 to the second operation region 121, 122 under the control of a conveyance execution component such as an automatic driving device. After completing the first operation task, the operators of each operation region may suspend a container 104 holding corresponding items on the corresponding first branch 102, so as to convey the container 104 to the second operation region 121, 122 by the conveying track. The container 104 may be in the form of a packaging bag or the like. Moreover, for ease of operation, each container 104 may have a connected or integrated member such as a hook (not shown in the figure) through which the container 104 can be suspended from the first branch 102 of the conveying track.

In addition, the issue of converging the execution results of different first operation tasks in the same wave to the same second operation region is involved in some embodiments of the present disclosure. Therefore, in actual implementation, the following processing may also be performed. First of all, a unique identifier (such as a code, etc.) is provided on an outer surface of the container 104. In some embodiments, the unique identifier may be realized by a graphic code, such as a bar code or a two-dimensional code. Moreover, a code scanner may be provided in each first operation region 111, 112, 113. After the operator in the first operation region 111, 112, 113 completes a first operation task and places the execution result of the operation in the container 104, the identifier information of the container may be acquired by code scanning. After that, a terminal device of the first operation region 111, 112, 113 may provide a mapping between the task identifier of the first operation task, the wave identifier corresponding to the first operation task, and the container identifier of the container to the control component 130 in the suspension chain system. That is, in addition to hardware structures such as the conveying track, the suspension chain system may also control specific conveyance paths via software. Thus, the control component 130 may assign a second operation region 121 or 122 according to the wave identifier and allocate different first operation tasks in the same wave to the same second operation region. That is, information recorded in the control component 130 at this point includes a mapping between the wave identifier, the task identifier of the first operation task, the container identifier, and the second operation region identifier. Then, the container 104 is suspended from the first branch 102 of the track and then is transported to the trunk 101 of the track. When the container 104 arrives at the junction between the trunk 101 and the second branch 103 of the track, as there are multiple branches 103, a code scanning device 105 may be provided at the junction between the trunk 101 and the second branch 103 in order to determine the next conveyance path. When a container is transported to the scanning range of the code scanning device 105, the code scanning device 105 may automatically scan the graphic code or the like on an outer surface thereof and provide the container identifier in the scanning result to the control component 130. Thus, the control component 130 may recognize which container has arrived at the junction between the trunk 101 and the second branch 103. Then, the control component 130 may determine which second operation region 121 or 122 the container should be transported to according to previously recorded mapping information. Then, the control component 130 may send a control instruction to the conveyance execution component so that the container is sent to the corresponding second branch 103 and conveyed to the corresponding second operation region 121 or 122 in the end. As shown in FIG. 1, two containers 104 from two different first branches 102 may be conveyed via the trunk 101 to the same second branch 103, and then sent to the same second operation region, thus achieving "convergence."

In summary, in the foregoing manner, the operator in the first operation region can directly suspend a container from the corresponding track branch after completing the first operation task, without performing operations such as selecting a conveyance track. The subsequent process can be completed under automatic control, which improves the efficiency of the operation.

Apparently, FIG. 1 is described in the foregoing merely as an example to illustrate some specific embodiments. In actual applications, various implementation solutions may also be adopted. For example, a separate conveying track can be deployed between each first operation region and each second operation region, a specific track is assigned prior to suspension, and then a container is suspended from the corresponding track and conveyed to the corresponding second operation region, and so on, and further explanation is omitted herein for the sake of brevity.

It should be noted that in the process of performing the first operation, conveyance, and the second operation in the foregoing manner, network or hardware exceptions or task operation errors (such as the second operation region being incorrectly assigned) may occur. As a result, the first operation container may slide into the wrong second operation region, the first operation task may be incomplete, etc., which eventually leads to stalling of the operations of the entire wave. Therefore, an exception management system may be provided in some embodiments of the present disclosure. Information such as the assignment results of the suspension chain system may be provided to the exception management system. Thus, the exception management system may track the execution status of a specific first operation task of a specific wave, and so on. If it is found that an exception occurred in a certain first operation task of a certain wave, a query may be conducted by the exception management system to determine a possible cause of the exception, and so on. Thus, the cause of the exception can be located rapidly, in order to further guarantee the timeliness of delivery.

The implementation solutions of various embodiments of the present disclosure will be discussed in the following paragraphs from a variety of different perspectives.

Figure 2:
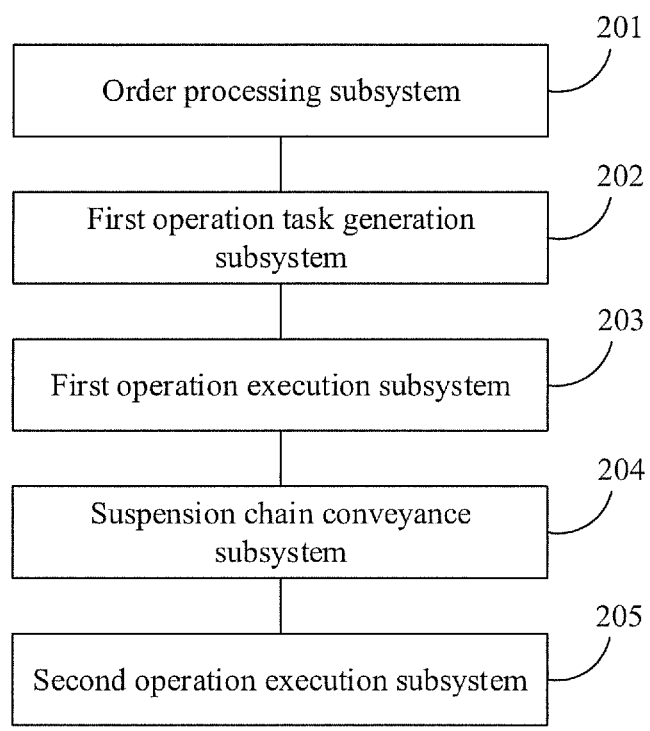
FIG. 2 is an exemplary schematic diagram illustrating a system according to some embodiments of the present disclosure.

First of all, reference is made to FIG. 2, which is an exemplary schematic diagram illustrating a data object information processing system 200 as a whole according to some embodiments of the present disclosure. The data object information processing system 200 includes an order processing subsystem 201, a first operation task generation subsystem 202, a first operation execution subsystem 203, and a suspension chain conveyance subsystem 204.

The order processing subsystem 201 is configured to merge orders meeting a condition into the same wave according to a preset rule.

Specifically, the order processing subsystem 201 may be located in a cloud-based sales platform, and the cloud uniformly performs merging orders and other operations on orders in various offline stores. Alternatively, the order processing subsystem 201 may also be directly deployed in offline stores, to merge orders of the offline store by each offline store respectively. Specific order-merging rules may be realized in various specific manners, including merging orders meeting a condition into the same wave according to distances of delivery addresses and similarity of delivery times, etc. For the sake of brevity, further explanation is omitted herein. Specifically, a wave identifier, such as a wave ID or the like, may be generated for a wave after the wave is generated.

The first operation task generation subsystem 202 is configured to classify data objects included in the orders of the same wave according to different first operation regions where the corresponding goods are located, generate first operation tasks according to the classification result, and allocate the first operation tasks to the corresponding first operation execution subsystem 203.

The first operation task generation subsystem 202 may also be located in the cloud or in the offline store. The first operation task generation subsystem 202 may store detail information of first operation regions in the offline store in advance. After obtaining the information of a specific wave, the first operation task generation subsystem 202 may disassemble the wave into different first operation tasks according to associated data objects in the wave and first operation regions where the data objects are located. Similarly, after each first operation task is generated, a task identifier of the first operation task may also be generated, which includes an ID of the first operation task, etc. Moreover, a mapping between the wave ID and the ID of each first operation task may be established.

The first operation execution subsystem 203 is configured to, after receiving a message indicating that the current first operation task is completed and a first operation container is suspended from a suspension chain, notify the suspension chain conveyance subsystem 204 of the task identifier of the current first operation task and the wave identifier of the wave to which the current first operation task belongs. The first operation container contains goods corresponding to the current first operation task.

The first operation execution subsystem 203 may be located in the offline store. A device such as a computer may be deployed in each first operation region, or workers in each first operation region are equipped with a mobile terminal device. An application corresponding to the first operation execution subsystem 203 may be installed in such computer device or mobile terminal device. Correspondingly, after receiving a first operation task allocated by the first operation task generation subsystem 202, the first operation execution subsystem 203 may prompt the corresponding worker to execute the corresponding task. In addition, the first operation execution subsystem 203 is further capable of transferring information with the suspension chain conveyance subsystem 204. After the worker performs order-picking and other operations according to the specific first operation task, he or she can place the corresponding goods in a container such as a packaging bag and suspend the container from the conveying track. At this point, the first operation execution subsystem 203 may notify the suspension chain conveyance subsystem 204 that the first operation task is completed. At the same time, information such as the corresponding wave identifier and the task identifier of the first operation task may be provided to the suspension chain conveyance subsystem 204. If there is a graphic code and/or other information on the outer surface of the container, the first operation execution subsystem 203 may be connected with an external code scanner, or provided with a built-in code scanning function, etc. A code scanning operation may be performed before the container is suspended from the conveying track. Thus, when the information is provided to the suspension chain conveyance subsystem 204, the information may also include the container identifier, in addition to the wave identifier and the task identifier of the first operation task.

The suspension chain conveyance subsystem 204 is deployed in the offline store including multiple first operation regions and multiple second operation regions. The suspension chain conveyance subsystem 204 includes the control component and the conveying track. The conveying track is configured to connect the first operation regions and the second operation regions. The control component is configured to assign a second operation region according to the wave identifier after receiving the notification message from the first operation execution subsystem 203. The first operation tasks of the same wave correspond to the same second operation region, and a conveyance instruction is sent to the conveying track according to the assignment result, for conveying the first operation container to the corresponding second operation region.

The suspension chain conveyance subsystem 204 is deployed in the offline store, and includes a hardware part and a software part. The hardware part may include specific physical transmission structures such as the conveying track and a driving device. The software part may be the control component for realizing automatic control over the process of conveying the container by the conveying track. Moreover, the control component may further control a mapping between the first operation task and the second operation region according to the notification message sent by the first operation execution subsystem 203. Specifically, different first operation tasks of the same wave may converge in the same second operation region, so as to improve the efficiency of the first operation and of the second operation.

In an actual application, the data object information processing system 200 may further include a second operation execution subsystem 205. In this case, the suspension chain conveyance subsystem 204 may be further configured to provide the mapping between the wave identifier and the second operation region identifier to the second operation execution subsystem 205.

Correspondingly, the second operation execution subsystem 205 may be configured to generate a second operation task according to the wave identifier, and provide corresponding prompt information of the second operation region identifier.

The second operation execution subsystem 205 may be deployed in the mobile terminal device of a worker, such as a packer, or in a computer device in a packaging room. When receiving a message indicating that the related first operation container is conveyed to a certain second operation region, the second operation execution subsystem 205 may generate a corresponding second operation task. In the task, prompts regarding information of the corresponding wave, related information of first operation tasks included in the wave, data object information corresponding to the first operation tasks, details of orders associated with the wave, and so on, may be delivered to a worker such as a specific packer. The worker performs a second operation such as packaging. Then, the orders may await a deliverer to carry out delivery in waves.

As described above, in some embodiments, if the outer surface of the first operation container are provided with the graphic code identifier, the first operation execution subsystem 203 may be further configured to scan and identify the graphic code identifier, obtain the container identifier, establish a mapping between the wave identifier, the task identifier of the first operation task, and the container identifier, and provide the mapping to the suspension chain conveyance subsystem 204. After assigning a second operation region according to the wave identifier, the control component of the suspension chain conveyance subsystem 204 stores a mapping between the wave identifier, the task identifier of the first operation task, the container identifier, and the second operation region identifier.

In some embodiments, the conveying track may include a trunk, multiple first branches, and multiple second branches. One end of each first branch is located in one of the first operation regions, and the other end is connected to the trunk. One end of each second branch is located in one of the second operation regions, and the other end is connected to the trunk.

In this case, the suspension chain conveyance subsystem 204 may further include a code scanning device. The code scanning device is located at the junction of the trunk and each second branch and configured to scan a graphic code on the outer surface of a first operation container entering its scanning range, identify the container identifier, and provide the container identifier to the control component. The control component determines the second operation region corresponding to the container identifier according to the identified container identifier and sends a control instruction to the conveying track. The conveying track transfers the container to the second branch corresponding to the second operation region.

In some embodiments, the control component in the suspension chain conveyance subsystem 204 may be further configured to provide the mapping between the wave identifier, the task identifier of the first operation task, the container identifier, and the second operation region identifier to the second operation execution subsystem 205. In this case, the second operation execution subsystem 205 may be further configured to scan the graphic code of the first operation container conveyed to the second operation region, and determine the corresponding wave identifier and the task identifier of the first operation task according to the scanning result, to confirm the completion of the first operation task in the wave.

Then, the second operation execution subsystem 205 may be further configured to generate outbound delivery information after confirming the completion of the first operation tasks in the same wave.

In addition, the data object information processing system 200 may further include an exception management subsystem.

In this case, the control component in the suspension chain conveyance subsystem 204 may be further configured to, after assigning the second operation region according to the wave identifier, provide the mapping between the wave identifier, the task identifier of the first operation task, the container identifier, and the second operation region identifier to the exception management subsystem for storage. The second operation execution subsystem 205 may be further configured to send a query request for an exception to the exception management subsystem if the first operation container corresponding to a target first operation task in the wave is not conveyed to the second operation region within a preset time. The exception management subsystem may be specifically configured to provide a query result according to the stored assignment result when receiving the query request for the exception.

In some embodiments, the exception management subsystem may be specifically configured to indicate, in the query result, that the first operation task is uncompleted if assignment information of the second operation region corresponding to the target first operation task is absent from the assignment result.

Alternatively, the exception management subsystem may also be specifically configured to, provide the second operation region corresponding to the target first operation task in the query result, if assignment information of the second operation region corresponding to the target first operation task exists in the assignment result but the second operation region corresponding to the target first operation task is different from the second operation region corresponding to other first operation tasks in the wave the target first operation task belongs to.

In summary, through the foregoing system provided in the embodiments of the present disclosure, the first operations, the conveyance, and the second operations in the offline store can be combined organically in series. The containers produced from the first operations can be conveyed to the second operation regions automatically by the suspension chain subsystem. Moreover, different first operation tasks of the same wave may converge in the same second operation region to improve the efficiency of the first operation and of the second operation, and to further guarantee the timeliness of delivery.

In addition, a fault management subsystem is further provided in the embodiments of the present disclosure. The fault management subsystem may track the status of the first operation tasks, the assignment of the second operation regions, and the like. Once some first operation tasks of a certain wave fail to arrive at a scheduled second operation region on time, the fault management subsystem can be utilized to make a query and locate the cause of the exception, thus avoiding stalling of the operations of the entire wave.

Figure 3:
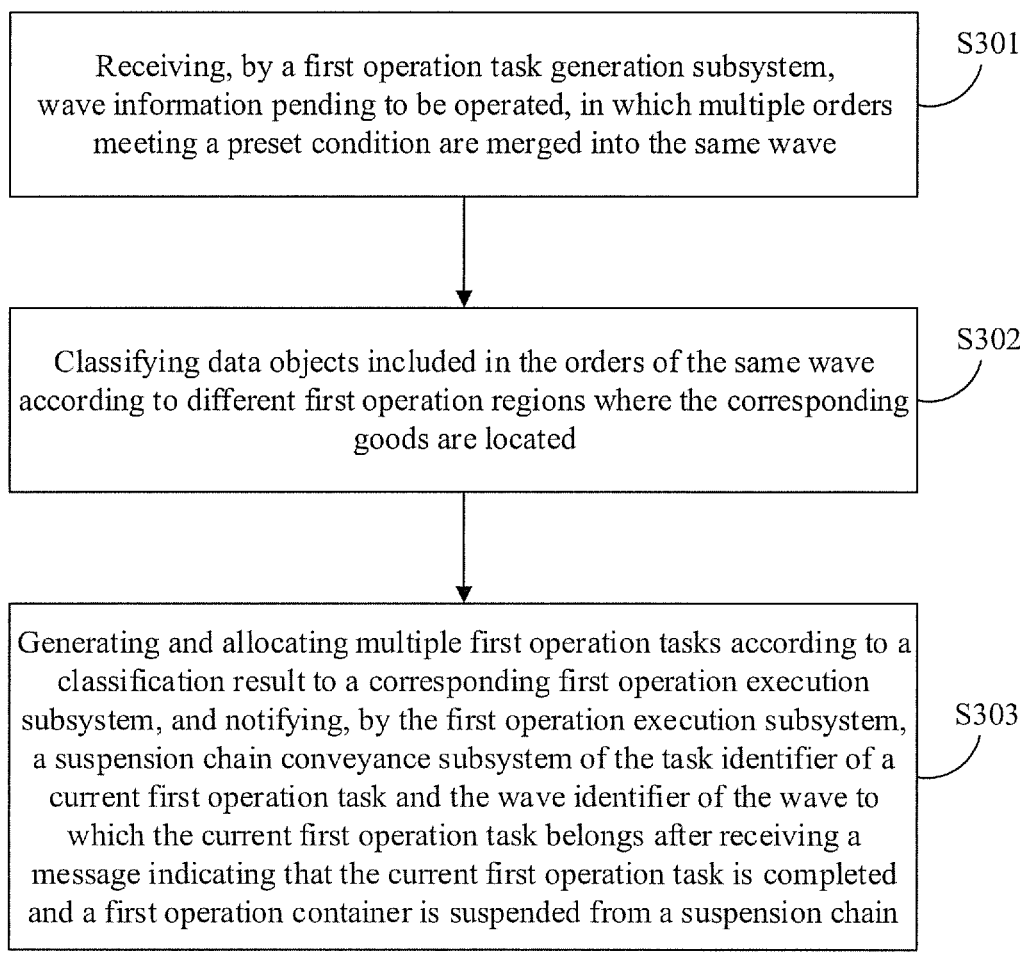
FIG. 3 is an exemplary flowchart of a first method according to some embodiments of the present disclosure.

Reference is made to FIG. 3, which is an exemplary flowchart of a data object information processing method 300 according to some embodiments of the present disclosure. The embodiments shown in FIG. 3 correspond to the embodiments shown in FIG. 2 and provide the data object information processing method 300 from the perspective of a first operation task generation subsystem (e.g., the first operation task generation subsystem 202 in FIG. 2). Referring to FIG. 3, the data object information processing method 300 may include following steps S301, S302 and S303.

In step S301, a first operation task generation subsystem receives wave information pending to be operated, in which multiple orders meeting a preset condition are merged into the same wave.

In step S302, data objects included in the orders of the same wave are classified according to different first operation regions where the corresponding goods are located.

In step S303, multiple first operation tasks are generated according to the classification result and allocated to a corresponding first operation execution subsystem (e.g., the first operation execution subsystem 203 in FIG. 2). The first operation execution subsystem notifies a suspension chain conveyance subsystem (e.g., the suspension chain conveyance subsystem 204 in FIG. 2) of the task identifier of a current first operation task and the wave identifier of the wave to which the current first operation task belongs after receiving a message indicating that the current first operation task is completed and a first operation container is suspended from a suspension chain. The suspension chain conveyance subsystem conveys first operation containers corresponding to the first operation tasks of the same wave to the same second operation region. The suspension chain conveyance subsystem is deployed in the offline store including multiple first operation regions and multiple second operation regions. The suspension chain conveyance subsystem includes a control component and a conveying track configured to connect the first operation regions and the second operation regions.

Figure 4:
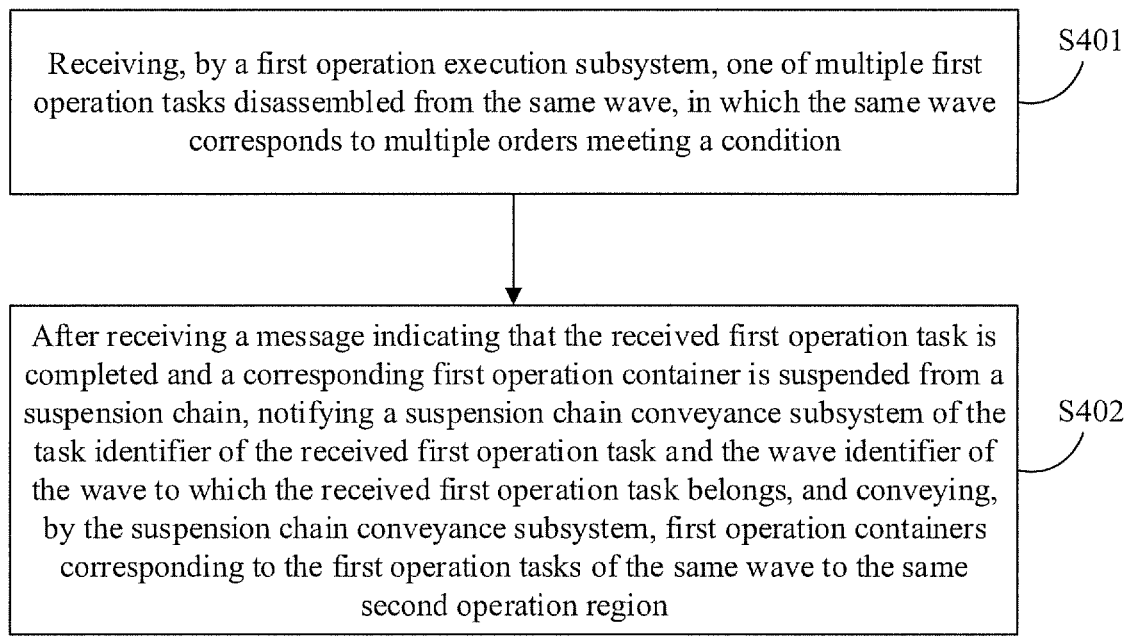
FIG. 4 is an exemplary flowchart of a second method according to some embodiments of the present disclosure.

Reference is made to FIG. 4, which is an exemplary flowchart of a data object information processing method 400 according to some embodiments of the present disclosure. The embodiments shown in FIG. 4 also correspond to the embodiments shown in FIG. 2 and provide the data object information processing method 400 from the perspective of a first operation execution subsystem (e.g., the first operation execution subsystem 203 in FIG. 2). Referring to FIG. 4, the data object information processing method 400 may include following steps S401 and S402.

In step S401, a first operation execution subsystem receives one of multiple first operation tasks disassembled from the same wave, in which the same wave corresponds to multiple orders meeting a condition.

In step S402, after receiving a message indicating that the received first operation task is completed and a corresponding first operation container is suspended from a suspension chain, a suspension chain conveyance subsystem (e.g., the suspension chain conveyance subsystem 204 in FIG. 2) is notified of the task identifier of the received first operation task and the wave identifier of the wave to which the received first operation task belongs. The suspension chain conveyance subsystem conveys first operation containers corresponding to the first operation tasks of the same wave to the same second operation region. The suspension chain conveyance subsystem is deployed in the offline store including multiple first operation regions and multiple second operation regions. The suspension chain conveyance subsystem includes a control component and a conveying track configured to connect the first operation regions and the second operation regions.

The outer surface of the first operation container is provided with a graphic code identifier. In this case, the graphic code identifier may also be scanned and identified to obtain a container identifier. Then, a mapping between the wave identifier, the task identifier of the first operation task, and the container identifier is established and provided to the suspension chain conveyance subsystem. After assigning the second operation region according to the wave identifier, the control component of the suspension chain conveyance subsystem stores a mapping between the wave identifier, the task identifier of the first operation task, the container identifier, and the second operation region identifier.

Figure 5:
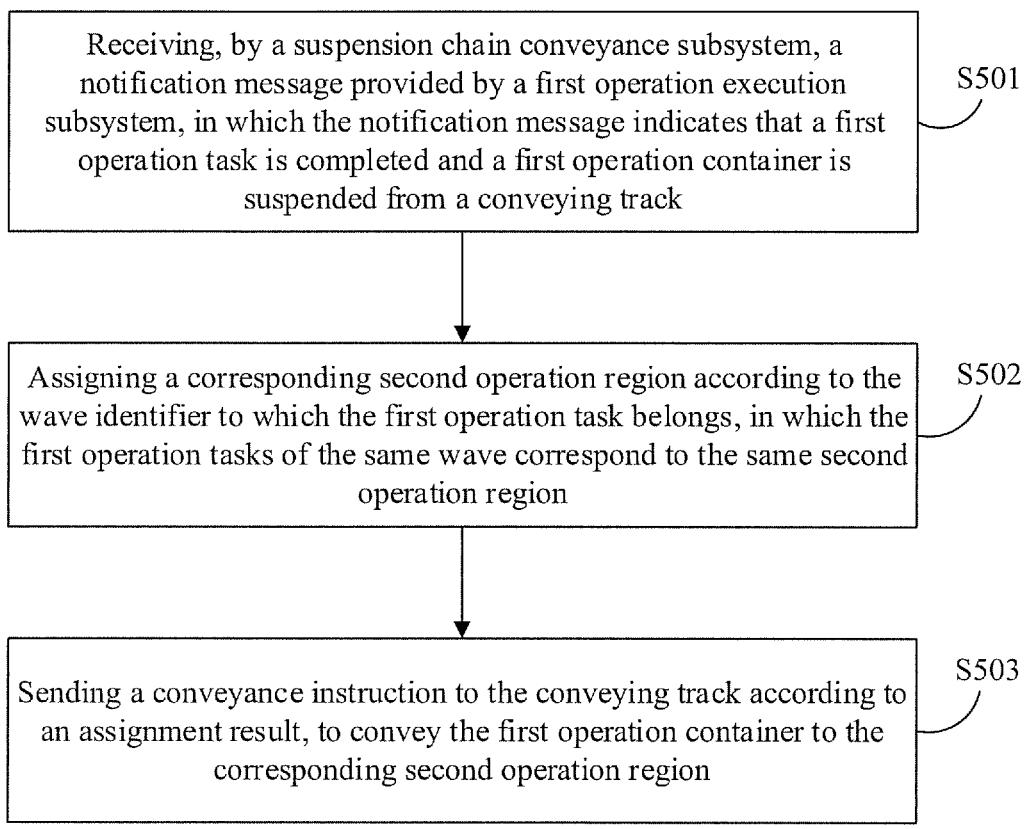
FIG. 5 is an exemplary flowchart of a third method according to some embodiments of the present disclosure.

Reference is made to FIG. 5, which is an exemplary flowchart of a data object information processing method 500 according to some embodiments of the present disclosure. The embodiments shown in FIG. 5 also correspond to the embodiments shown in FIG. 2 and provide data object information processing method 500 from the perspective of a suspension chain conveyance subsystem (e.g., the suspension chain conveyance subsystem 204 in FIG. 2). Referring to FIG. 5, the data object information processing method 500 may include following steps S501, S502, and S503.

In S501: a suspension chain conveyance subsystem receives a notification message provided by a first operation execution subsystem (e.g., the first operation execution subsystem 203 in FIG. 2). The notification message indicates that a first operation task is completed and a first operation container is suspended from a conveying track. The suspension chain conveyance subsystem is deployed in the offline store including multiple first operation regions and multiple second operation regions. The suspension chain conveyance subsystem includes a control component and a conveying track configured to connect the first operation regions and the second operation regions.

In S502, a corresponding second operation region is assigned according to the wave identifier to which the first operation task belongs. The first operation tasks of the same wave correspond to the same second operation region. The same wave corresponds to multiple orders meeting a condition and is disassembled into multiple first operation tasks.

In S503, a conveyance instruction is sent to the conveying track according to the assignment result, to convey the first operation container to the corresponding second operation region.

In some embodiments, after receiving the notification message provided by the first operation execution subsystem, the suspension chain conveyance subsystem may determine the wave identifier of the first operation task related to the notification message. Then, the suspension chain conveyance subsystem may identify whether a second operation region is assigned according to the wave identifier. In response to an identification that the second operation region is assigned, the suspension chain conveyance subsystem determine the second operation region corresponding to the current first operation task according to the assignment result. On the other hand, in response to an identification that the second operation region is not assigned, the suspension chain conveyance subsystem may assign a second operation region to the wave, and may store a mapping between the wave identifier and the second operation region identifier.

In addition, in order to track exceptions, after assigning the second operation region according to the wave identifier, the suspension chain conveyance subsystem may provide assignment result information to the exception management subsystem for storage. When an exception occurs, the cause of the exception can be queried by the exception management subsystem.

Specific details for implementation for embodiments shown in FIG. 2 to FIG. 5 are described in the foregoing description. For the sake of brevity, further explanation is omitted herein.

Figure 6:
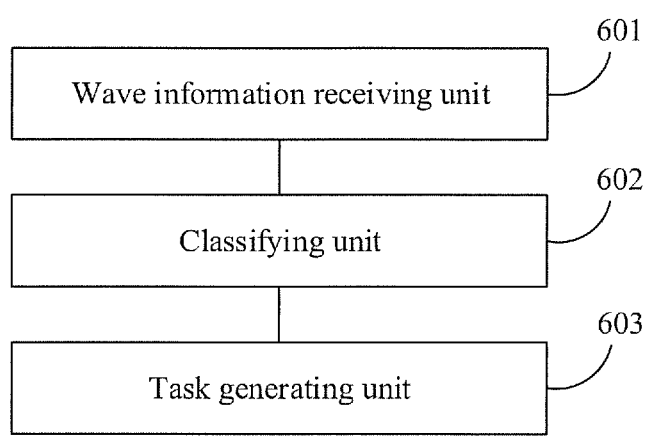
FIG. 6 is an exemplary schematic diagram illustrating a first apparatus according to some embodiments of the present disclosure.

Corresponding to embodiments shown in FIG. 3, reference is made to FIG. 6, which is an exemplary schematic diagram illustrating a data object information processing apparatus 600 according to some embodiments of the present disclosure. Referring to FIG. 6, the data object information processing apparatus 600 is applied to a first operation task generation subsystem, and includes a wave information receiving unit 601, a classifying unit 602, and a task generating unit 603.

The wave information receiving unit 601 is configured to receive wave information pending to be operated. Multiple orders meeting a preset condition are merged into the same wave.

The classifying unit 602 is configured to classify data objects in the orders of the same wave according to different first operation regions where the corresponding goods are located.

The task generating unit 603 is configured to generate multiple first operation tasks according to the classification result, and allocate the first operation tasks to a corresponding first operation execution subsystem. After receiving a message indicating that a first operation task is completed and a first operation container is suspended from a suspension chain, the first operation execution subsystem notifies a suspension chain conveyance subsystem of the task identifier of the current first operation task and the wave identifier of the wave to which the current first operation task belongs. The suspension chain conveyance subsystem conveys first operation containers corresponding to the first operation tasks of the same wave to the same second operation region. The suspension chain conveyance subsystem is deployed in an offline store including multiple first operation regions and multiple second operation regions. The suspension chain conveyance subsystem includes a control component and a conveying track configured to connect the first operation regions and the second operation regions.

Figure 7:
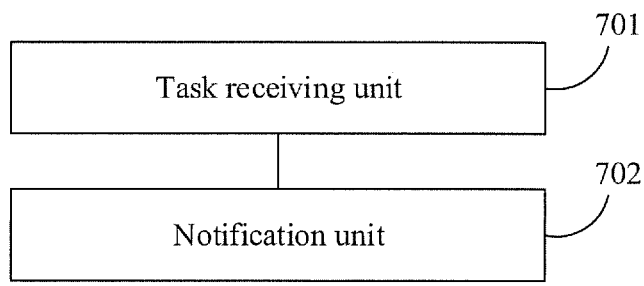
FIG. 7 is an exemplary schematic diagram illustrating a second apparatus according to some embodiments of the present disclosure.

Corresponding to embodiments shown in FIG. 4, reference is made to FIG. 7, which is an exemplary schematic diagram illustrating a data object information processing apparatus 700 according to some embodiments of the present disclosure. Referring to FIG. 7, the data object information processing apparatus 700 is applied to a first operation execution subsystem, and includes a task receiving unit 701 and a notification unit 702.

The task receiving unit 701 is configured to receive a first operation task. The received first operation task is one of multiple first operation tasks disassembled from the same wave which corresponds to multiple orders meeting a condition.

The notification unit 702 is configured to, after receiving a message indicating that the first operation task is completed and a corresponding first operation container is suspended from a suspension chain, notify a suspension chain conveyance subsystem of the task identifier of the first operation task and the wave identifier of the wave to which the first operation task belongs. The suspension chain conveyance subsystem conveys the first operation containers corresponding to the first operation tasks of the same wave to the same second operation region. The suspension chain conveyance subsystem is deployed in an offline store including multiple first operation regions and multiple second operation regions. The suspension chain conveyance subsystem includes a control component and a conveying track configured to connect the first operation regions and the second operation regions.

In some embodiments, the outer surface of the first operation container is provided with a graphic code identifier. In this case, the data object information processing apparatus 700 may further include a scanning unit configured to scan and identify the graphic code identifier to obtain a container identifier, establish a mapping between the wave identifier, the task identifier of the first operation task, and the container identifier, and provide the established mapping to the suspension chain conveyance subsystem. After assigning a second operation region according to the wave identifier, the control component of the suspension chain conveyance subsystem stores a mapping between the wave identifier, the task identifiers of the first operation tasks, the container identifier, and the second operation region identifier.

Figure 8:
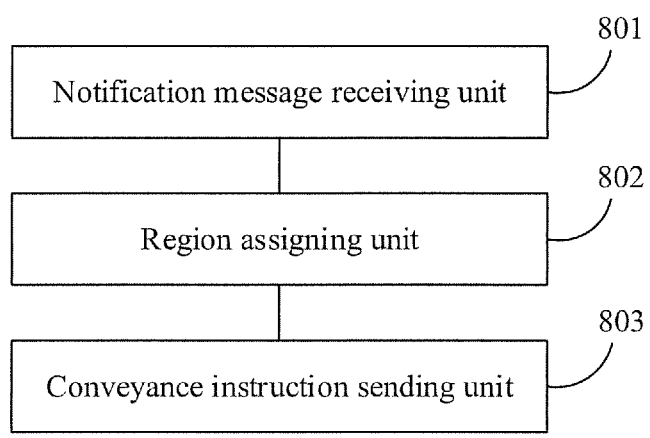
FIG. 8 is an exemplary schematic diagram illustrating a third apparatus according to some embodiments of the present disclosure.

Corresponding to embodiments shown in FIG. 5, reference is made to FIG. 8, which is an exemplary schematic diagram illustrating a data object information processing apparatus 800 according to some embodiments of the present disclosure. Referring to FIG. 8, the data object information processing apparatus 800 is applied to a suspension chain conveyance subsystem, and includes a notification message receiving unit 801, a region assigning unit 802, and a conveyance instruction sending unit 803.

The notification message receiving unit 801 is configured to receive a notification message provided by a first operation execution subsystem. The notification message indicates that a first operation task is completed and a first operation container is suspended from a conveying track. The suspension chain conveyance subsystem is deployed in an offline store including multiple first operation regions and multiple second operation regions. The suspension chain conveyance subsystem includes a control component and a conveying track configured to connect the first operation regions and the second operation regions.

The region assigning unit 802 is configured to assign a corresponding second operation region according to the wave identifier of the wave to which the first operation task belongs. The first operation tasks of the same wave correspond to the same second operation region. The same wave corresponds to multiple orders meeting a condition and is disassembled into multiple first operation tasks.

The conveyance instruction sending unit 803 is configured to send a conveyance instruction to the conveying track according to the assignment result, in order to convey the first operation container to the corresponding second operation region.

In some embodiments, the region assigning unit may specifically include a wave identifier determination subunit, an identifying subunit, a first determination subunit and a second determination subunit.

The wave identifier determination subunit is configured to determine the wave identifier of the first operation task related to the notification message after receiving the notification message.

The identifying subunit is configured to identify whether a second operation region is assigned for the wave identifier.

The first determination subunit is configured to determine the second operation region corresponding to the current first operation task according to the assignment result if a second operation region is assigned.

The second determination subunit is configured to assign a second operation region for the wave if the second operation region is not assigned, and store a mapping between the wave identifier and the second operation region identifier.

In addition, the data object information processing apparatus 800 may further include an assignment result providing unit configured to provide assignment result information to an exception management subsystem for storage after the second operation region is assigned according to the wave identifier. When an exception occurs, the cause of the exception is queried by the exception management subsystem.

By utilizing the embodiments of the present disclosure, the first operations, the conveyance, and the second operations in the offline store can be combined in series organically. The containers produced from the first operations can be conveyed to the second operation regions automatically by the suspension chain subsystem. Moreover, different first operation tasks of the same wave may also converge in the same second operation region so as to improve the efficiency of the first operation and of the second operation, and further guarantee the timeliness of delivery.

In addition, a fault management subsystem is further provided in the embodiments of the present disclosure. The fault management subsystem may track the status of the first operation tasks, the assignment of the second operation regions, and the like. Once some first operation tasks of a certain wave fail to arrive at a scheduled second operation region on time, the fault management subsystem can be utilized to make a query and locate the cause of the exception, thus avoiding stalling of the operations of the entire wave.

From the description of the embodiments above, those skilled in the art can clearly understand that the present disclosure may be implemented by hardware, or may be implemented by software plus a necessary universal hardware platform. Based on such understanding, the technical solutions as a whole, or the portion that makes contribution to the prior art, of the present disclosure, may be substantially implemented in the form of a software product. The computer software product may be stored in a volatile or non-volatile storage medium, such as a ROM/RAM, a magnetic disk, an optical disc, etc., and include a set of instructions that enable a computer device (which may be a personal computer, a server, a network device, or the like) to execute the methods in the embodiments or certain portions of the embodiments of the present disclosure. Common forms of non-transitory media include, for example, a floppy disk, a flexible disk, hard disk, solid state drive, magnetic tape, or any other magnetic data storage medium, a CD-ROM, any other optical data storage medium, a RAM, a PROM, and EPROM, a FLASH-EPROM or any other flash memory, NVRAM any other memory chip or cartridge, and networked versions of the same.

The embodiments in the specification are described in a progressive manner, identical or similar parts of the embodiments may be obtained with reference to each other, and each embodiment emphasizes a part different from other embodiments. In particular, the systems or system embodiments are generally similar to the method embodiments, so they are described concisely. For related parts, reference may be made to the descriptions of which in the method embodiments. The systems and the system embodiments described in the foregoing are merely illustrative examples. The units, which are described above as separate components, may be or may not be physically separated. Components shown and/or described as units may be or may not be physical units. That is, these components may be located in one place, or may be distributed in multiple network units. Some or all of the modules may be selected according to actual needs to achieve one or more objectives of the embodiments. Those skilled in the art can understand and implement the present disclosure without creative efforts.

The data object information processing methods, apparatuses, and systems provided in the present disclosure are described in the foregoing in detail. The principles and implementation embodiments of the present disclosure are described by applying specific examples in this content. The foregoing descriptions in the embodiments are merely used to help understand the method of the present disclosure and the core concepts thereof. For those skilled in the art, modifications may be made to the specific implementation embodiments and the application scopes based on the concepts of the present disclosure. In summary, the content of the specification is not meant to limit the present disclosure. Any modifications, equivalent replacements, or improvements made within the spirit and principle of the present disclosure should fall within the protection scope of the present disclosure.

The present disclosure may be described in a general context of computer-executable commands or operations, such as a program module, stored on a computer-readable medium and executed by a computing device or a computing system, including at least one of a microprocessor, a processor, a central processing unit (CPU), a graphics processing unit (GPU), etc. In general, the program module may include routines, procedures, objects, components, data structures, processors, memories, and the like for performing specific tasks or implementing a sequence of steps or operations.

Embodiments of the present disclosure may be embodied as a method, an apparatus, a device, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above.

Various functional components or blocks have been described herein. As will be appreciated by those skilled in the art, the functional blocks may be implemented through circuits (either dedicated circuits, or general purpose circuits, which operate under the control of one or more processors and coded instructions), which will typically include transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

In general, the word "module" and/or "unit," as used in this document, can be a packaged functional hardware unit designed for use with other components (e.g., portions of an integrated circuit) or a part of a program (stored on a computer-readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer-readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein can be implemented as software modules but can also be represented in hardware or firmware. Generally, the modules described herein refer to logical modules that can be combined with other modules or divided into sub-modules despite their physical organization or storage.

It should also be noted that, the relational terms such as "first" and "second" are only used to distinguish an entity or operation from another entity or operation and do necessarily require or imply that any such actual relationship or order exists among these entities or operations. As used herein, the terms "include," "comprise," and their grammatical variants are intended to be non-limiting, such that recitation of items in a list is not to the exclusion of other like items that can be substituted or added to the listed items.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A data object information processing system, comprising:
    a suspension chain conveyance subsystem deployed in an offline store, the offline store comprising a plurality of first operation regions and a plurality of second operation regions, wherein:
        the suspension chain conveyance subsystem comprises a control component and a conveying track;
        the conveying track is configured to connect the first operation regions and the second operation regions;
        first operation tasks are performed in each of the first operation regions;
        second operation tasks are performed in each of the second operation regions; and
        each of the plurality of first operation regions includes goods to fulfill orders;
    an order processing subsystem configured to merge a plurality of orders into one or more waves, each wave including a plurality of orders meeting a condition according to a preset rule;
    an operation task generation subsystem, wherein for each wave, the operation task generation subsystem is configured to:
        classify data objects of orders that have been merged together into the wave to first operation regions where goods corresponding to the orders in the wave are located; and
        generate a plurality of first operation tasks based on the classification results, wherein, for each wave, after the first operation tasks are performed, the corresponding goods of the wave are allocated to the same second operation region; and
    a first operation execution subsystem configured to:
        allocate the first operation tasks generated by the operation task generation subsystem; and
        after receiving a message indicating that a current first operation task is completed and that a first operation container is suspended from a suspension chain, notify the suspension chain conveyance subsystem of a task identifier of the current first operation task and a wave identifier of the wave to which the current first operation task belongs, the first operation container contains goods corresponding to the current first operation task; and
    wherein, for each wave, the control component is configured to:
        assign the corresponding second operation region based on the wave identifier after receiving a notification message from the first operation execution subsystem; and
        send, based on an assignment result, a conveyance instruction to the conveying track to convey the first operation container to the corresponding second operation region.

2. The data object information processing system of claim 1, further comprising a second operation execution subsystem,
    wherein the suspension chain conveyance subsystem is further configured to provide a mapping to the second operation execution subsystem, the mapping being between the wave identifier and a second operation region identifier; and
    the second operation execution subsystem is configured to:
        generate a second operation task based on the wave identifier; and
        provide corresponding prompt information of the second operation region identifier.

3. The data object information processing system of claim 1, wherein an outer surface of the first operation container is provided with a graphic code identifier;
    the first operation execution subsystem is further configured to:
        scan and identify the graphic code identifier to obtain a container identifier;
        establish a mapping between the wave identifier, the task identifier of the first operation task, and the container identifier; and
        provide the mapping to the suspension chain conveyance subsystem; and
    the control component of the suspension chain conveyance subsystem is further configured to store a mapping between the wave identifier, the task identifier of the first operation task, the container identifier, and a second operation region identifier after assigning the second operation region based on the wave identifier.

4. The data object information processing system of claim 3, wherein:
the conveying track comprises a trunk, a plurality of first branches, and a plurality of second branches, wherein:
one end of each first branch is located in one of the first operation regions, and the other end of each first branch is connected to the trunk; and
one end of each second branch is located in one of the second operation regions, and the other end of each second branch is connected to the trunk;
the suspension chain conveyance subsystem further comprising a code scanning device located at a junction of the trunk and each second branch, the code scanning device configured to:
scan the graphic code identifier on the outer surface of the first operation container entering a scanning range; and
identify and provide the container identifier to the control component; and
the control component is further configured to:
determine the second operation region based on the container identifier; and
send a control instruction to the conveying track, to transfer, by the conveying track, the first operation container to the second branch that corresponds to the determined second operation region.

5. The data object information processing system of claim 3, further comprising a second operation execution subsystem,
wherein the control component is further configured to provide the mapping between the wave identifier, the task identifier of the first operation task, the container identifier, and the second operation region identifier to the second operation execution subsystem; and
the second operation execution subsystem is configured to:
scan the graphic code identifier of the first operation container conveyed to the second operation region; and
determine the corresponding wave identifier and the task identifier of the first operation task based on a scanning result, to confirm a completion of the first operation task in the wave.

6. The data object information processing system of claim 5, wherein
the second operation execution subsystem is further configured to generate outbound delivery information after confirming the completion of each first operation task in the wave.

7. The data object information processing system of claim 3, further comprising an exception management subsystem and a second operation execution subsystem,
wherein the control component is further configured to, after assigning the second operation region based on the wave identifier, provide the mapping between the wave identifier, the task identifier of the first operation task, the container identifier, and the second operation region identifier to the exception management subsystem for storage;
the second operation execution subsystem is further configured to send a query request for an exception to the exception management subsystem if the first operation container corresponding to a target first operation task in the wave is not conveyed to the second operation region within a preset time; and
the exception management subsystem is configured to provide a query result based on a stored assignment result when receiving the query request for the exception.

8. The data object information processing system of claim 7, wherein
the exception management subsystem is configured to indicate, in the query result, that the first operation task is uncompleted if assignment information of the second operation region corresponding to the target first operation task is absent from the stored assignment result.

9. The data object information processing system of claim 7, wherein
the exception management subsystem is configured to provide the second operation region corresponding to the target first operation task in the query result, if assignment information of the second operation region corresponding to the target first operation task exists in the assignment result but the second operation region corresponding to the target first operation task is different from the second operation region corresponding to other first operation tasks in the wave the target first operation task belongs to.

10. A data object information processing method for an offline store, the offline store comprising a plurality of first operation regions and a plurality of second operation regions, the data object information processing method comprising:
receiving a plurality of orders, wherein groups of orders meeting a preset condition are merged into waves;
receiving, by a first operation task generation subsystem, wave information for orders pending to be operated on;
classifying data objects in the orders for each wave according to different first operation regions where goods corresponding to the orders in a wave are located;
generating a plurality of first operation tasks based on a classification result;
allocating the first operation tasks to a corresponding first operation execution subsystem;
notifying, by the first operation execution subsystem, a suspension chain conveyance subsystem of a task identifier of a current first operation task and a wave identifier of the wave to which the current first operation task belongs, the first operation execution subsystem notifying the suspension chain conveyance subsystem after receiving a message indicating that the current first operation task is completed and that a first operation container is suspended from a suspension chain; and
for each wave, conveying, by the suspension chain conveyance subsystem, the first operation containers corresponding to the first operation task of the wave to the same second operation region, wherein the suspension chain conveyance subsystem is deployed in the offline store and the suspension chain conveyance subsystem comprises:
a control component; and
a conveying track configured to connect the first operation regions and the second operation regions.

11. The data object information processing method of claim 10, further comprising:
receiving one of the plurality of first operation tasks disassembled from the wave by the first operation execution subsystem, wherein the wave corresponds to the plurality of orders meeting the preset condition;

after receiving the message indicating that the received first operation task is completed and that the first operation container is suspended from the suspension chain, notifying the suspension chain conveyance subsystem of the task identifier of the received first operation task and the wave identifier of the wave to which the received first operation task belongs; and conveying, by the suspension chain conveyance subsystem, the first operation containers corresponding to the first operation tasks of the wave to the same second operation region.

12. The data object information processing method of claim 11, wherein an outer surface of the first operation container is provided with a graphic code identifier; and the data object information processing method further comprises:

scanning and identifying the graphic code identifier to obtain a container identifier;

establishing a mapping between the wave identifier, the task identifier of the first operation task, and the container identifier;

providing the mapping to the suspension chain conveyance subsystem; and after assigning the second operation region based on the wave identifier, storing, by the control component of the suspension chain conveyance subsystem, a mapping between the wave identifier, the task identifier of the first operation task, the container identifier, and a second operation region identifier.

13. The data object information processing method of claim 10, further comprising:

receiving, by the suspension chain conveyance subsystem, the notification message provided by the first operation execution subsystem, wherein the notification message indicates that the first operation task is completed and that the first operation container is suspended from the conveying track;

assigning the corresponding second operation region based on the wave identifier of the wave to which the first operation task belongs, wherein the wave corresponds to the plurality of orders meeting the preset condition and is disassembled into the plurality of first operation tasks, and the first operation tasks of the wave correspond to the same second operation region; and sending a conveyance instruction to the conveying track based on an assignment result, to convey the first operation container to the corresponding second operation region.

14. The data object information processing method of claim 13, wherein the assigning the corresponding second operation region based on the wave identifier of the wave to which the first operation task belongs comprises:

after receiving the notification message, determining the wave identifier of the first operation task related to the notification message;

identifying whether a second operation region is assigned to the wave identifier;

in response to an identification that the second operation region is assigned to the wave identifier, determining the second operation region that corresponds to a current first operation task based on the assignment result; and in response to an identification that the second operation region is not assigned to the wave identifier, assigning the second operation region to the wave, and storing a mapping between the wave identifier and a second operation region identifier.

15. The data object information processing method of claim 13, further comprising:

after assigning the second operation region based on the wave identifier, providing assignment result information to an exception management subsystem for storage, and when an exception occurs, querying a cause of the exception by the exception management subsystem.

16. A non-transitory computer-readable medium that stores a set of instructions that is executable by at least one processor of an apparatus to cause the apparatus to perform a data object information processing method for an offline store, the offline store comprising a plurality of first operation regions and a plurality of second operation regions, the data object information processing method comprising:

receiving a plurality of orders, wherein groups of orders meeting a preset condition are merged into waves;

receiving, by a first operation task generation subsystem, wave information for orders pending to be operated on;

classifying data objects in the orders for each wave according to different first operation regions where goods corresponding to the orders in a wave are located;

generating a plurality of first operation tasks based on a classification result;

allocating the first operation tasks to a corresponding first operation execution subsystem; and notifying, by the first operation execution subsystem, a suspension chain conveyance subsystem of a task identifier of a current first operation task and a wave identifier of the wave to which the current first operation task belongs, the first operation execution subsystem notifying the suspension chain conveyance subsystem after receiving a message indicating that the current first operation task is completed and that a first operation container is suspended from a suspension chain, in order to convey first operation containers corresponding to the first operation tasks of the wave to the same second operation region by the suspension chain conveyance subsystem which is deployed in the offline store and the suspension chain conveyance subsystem comprises:

a control component; and a conveying track configured to connect the first operation regions and the second operation regions.

17. The non-transitory computer-readable medium of claim 16, wherein an outer surface of the first operation container is provided with a graphic code identifier, and the set of instructions that is executable by the at least one processor of the apparatus causes the apparatus to further perform:

scanning and identifying the graphic code identifier to obtain a container identifier;

establishing a mapping between the wave identifier, the task identifier of the first operation task, and the container identifier; and providing the mapping to the suspension chain conveyance subsystem, such that after assigning the second operation region based on the wave identifier, the control component of the suspension chain conveyance subsystem stores a mapping between the wave identifier, the task identifier of the first operation task, the container identifier, and the second operation region identifier.

18. The non-transitory computer-readable medium of claim 16, wherein the data object information processing method further comprises:

receiving, by the suspension chain conveyance subsystem, a notification message provided by the first operation execution subsystem, wherein the notification message indicates that the first operation task is completed and that the first operation container is suspended from the conveying track;

assigning the corresponding second operation region based on the wave identifier of the wave to which the first operation task belongs, wherein the wave corresponds to the plurality of orders meeting the preset condition and is disassembled into the plurality of first operation tasks, and the first operation tasks of the wave correspond to the same second operation region; and sending a conveyance instruction to the conveying track based on an assignment result, to convey the first operation container to the corresponding second operation region.

19. The non-transitory computer-readable medium of claim 18, wherein the set of instructions that is executable by the at least one processor of the apparatus causes the apparatus to perform the assigning the corresponding second operation region by:

after receiving the notification message, determining the wave identifier of the first operation task related to the notification message;

identifying whether the second operation region is assigned to the wave identifier;

in response to an identification that the second operation region is assigned to the wave identifier, determining the second operation region that corresponds to the current first operation task based on the assignment result; and in response to an identification that the second operation region is not assigned to the wave identifier, assigning the second operation region to the wave, and storing a mapping between the wave identifier and a second operation region identifier.

20. The non-transitory computer-readable medium of claim 18, wherein the set of instructions that is executable by the at least one processor of the apparatus causes the apparatus to further perform:

after assigning the second operation region based on the wave identifier, providing assignment result information to an exception management subsystem for storage, and when an exception occurs, querying a cause of the exception by the exception management subsystem.

* * * * *